July 17, 1962

E. E. PENTECOST 3,045,154

SELF-SYNCHRONOUS MOTOR SYSTEM

Filed Nov. 28, 1958

*INVENTOR.*
EUGENE E. PENTECOST

BY J. Lee Humphries

ATTORNEY

ANGLE OF ROTOR

ANGLE OF ROTOR

INVENTOR.
EUGENE E. PENTECOST

United States Patent Office 3,045,154
Patented July 17, 1962

3,045,154
SELF-SYNCHRONOUS MOTOR SYSTEM
Eugene E. Pentecost, Orange, Calif., assignor to
North American Aviation, Inc.
Filed Nov. 28, 1958, Ser. No. 776,786
16 Claims. (Cl. 318—23)

This invention relates to a servo system having greatly improved torque characteristics and response characteristics. In a specific embodiment, it relates to a multiphase, reversible motor whose magnetic field is servoed in accordance with the angular rotation of the rotor of the motor.

It is desired in many situations to provide precise motor response to a control signal or, in other situations, to provide maximum rotative torque upon the rotor of a motor, regardless of the angle of such rotor and independent of the speed of the rotor. The direction of rotation and the speed of rotation may be controlled from a position proximate to the motor or from a distant position as in the follow-up synchro art.

A system similar to that described herein is described in a patent issued to Bruce A. Sawyer for a "Torque Generating System," No. 2,700,127, issued January 18, 1955. In that patent is described how a substantially constant torque may be maintained over a wide speed range and also how the efficiency of an induction motor can be improved by utilizing the device of the invention. Furthermore, it is there indicated that the frequency of the exciting voltage does not limit the speed of a motor such as utilized in the device of the invention as is the ordinary case with respect to induction motors. The device of the invention is, therefore, particularly valuable for producing an improved response of an alternating current motor to a control signal.

The device of the instant invention provides several advantages over the invention illustrated in the Sawyer patent. Whereas multigrid vacuum tubes are illustrated in the Sawyer patent, in the device of the invention multigrid electron valves are not required. Therefore, simplified transistor circuitry may be utilized to accomplish the concept of this invention. The device of the invention further provides a signal whose ripple content is considerably less than that provided in the patent referred to above. Consequently, oscillations are removed from the rotor of the motor and a more accurate response to the control signal is obtained.

Briefly, the device of the invention comprises an alternating current motor and an angle indicator which indicates the position of the rotor of the motor. The particular device angle indicator illustrated herein is a resolver which is rotated by the motor rotor. Such resolver may be as illustrated in now abandoned application Serial No. 205,013, filed January 18, 1951, in the name of Bruce A. Sawyer for "Electromagnetic Angle Resolver," now abandoned. By shifting the relative phase of the outputs of the resolver and summing such outputs, there is obtained a signal of constant amplitude but varying phase in accordance with the position of the rotor of the motor which is to be controlled. In another embodiment, there is more directly obtained right from the resolver a signal whose phase varies with the position of the rotor. Such signal is divided into two signals in quadrature relationship with respect to each other which signals are used as references for respective demodulators. The input to such demodulators is a control signal. The output of the demodulators then drives the motor in the direction and at the speed directed by the control signal with the magnetic field of the motor always at a given position with respect to the rotor of the motor.

It is, therefore, an object of this invention to provide an improved self-synchronizing motor.

It is a further object of this invention to provide a self-synchronizing motor system which as improved operation characteristics.

A still further object of this invention is to provide a self-synchronizing motor system readily capable of transistorization.

Another object of the this invention is to provide a self-synchronizing motor system utilizing an electrical signal whose phase indicates angular position of the rotor of said motor.

Still another object of this invention is to provide an electrical signal whose phase varies in accordance with the angular position of the rotor of a motor.

A final object of this invention is to provide an alternating current motor whose magnetic field is dependent in its amplitude upon a control signal and in its space phase upon the position of the rotor of said motor.

Other objects of this invention will become apparent from the following description taken in connection with the accompanying drawings, in which.

Figure 1:
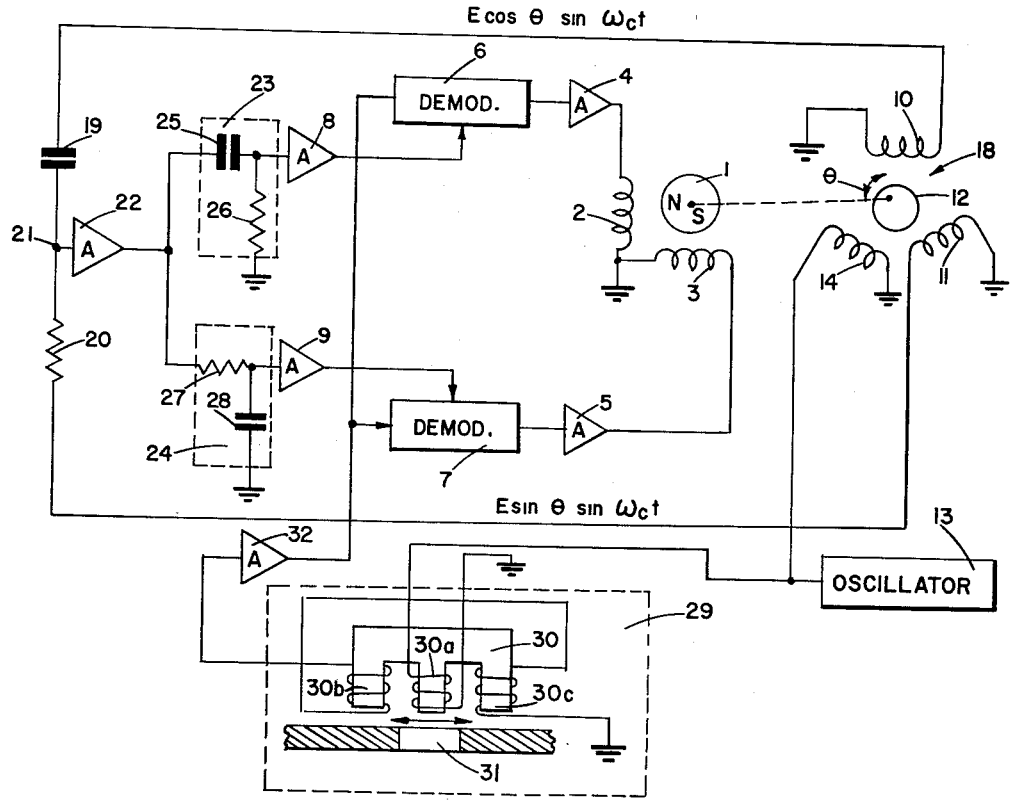
FIG. 1 is a schematic diagram of the device of the invention.
Figure 4:
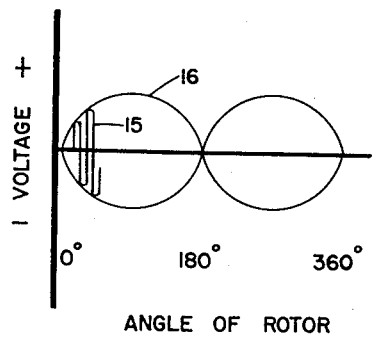
FIG. 4 is an illustration of a carrier modulated by a sine wave.
Figure 5:
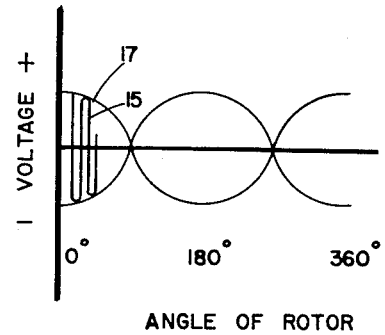
FIG. 5 is an illustration of a carrier modulated by a cosine wave.

Referring to FIG. 1, there is illustrated a two phase motor having magnetic rotor 1, a first phase winding 2, and a second phase winding 3 receiving signals through amplifiers, 4 and 5, from demodulators 6 and 7, respectively. The reference frequencies for the demodulators are received through amplifiers 8 and 9, respectively. The reference frequency signals are generated in windings 10 and 11 according to the angular position of rotor 1 inasmuch as there is mechanically connected to rotor 1 an eccentrically mounted, ferromagnetic rotor, or resolver structure 12, which acts to couple the output of oscillator 13 from winding 14 more or less strongly into the windings 10 or 11. The output signals provided by the windings 10 and 11 are therefore modulated carrier signals, the carrier being the frequency provided by oscillator 13 and the modulation provided by the rotation of eccentric resolver element 12. The windings 10 and 11 are arranged so that their modulation is 90° out of phase with respect to each other. Referring momentarily to FIG. 4, it may be seen that a carrier frequency 15 (provided by oscillator 13 in FIG. 1) is modulated by an envelope 16 (provided by the rotation of resolver 12 in FIG. 1). FIG. 5 illustrates that the same carrier frequency 15 is modulated by an envelope 17 (90° out of phase with the envelope 16 of FIG. 4) and such modulated carrier output is provided by coil 10 in FIG. 1.

There is provided then by the resolver 18, FIG. 1, a first carrier modulated output whose modulation is 90° out a phase with a second modulated carrier output. Capacitor 19 is connected to receive one of these outputs and resistor 20 is connected to receive the other. If the capacitive reactance of capacitor 19 is equal to the resistance of resistor 20 at the carrier frequency, the carrier frequency of each of the signals will be displaced in phase with respect to each other by 90°; and the summing point 21 will then provide an output signal which is a voltage of constant amplitude but whose phase is proportional to the angular position of rotor 1. After amplification and isolation by amplifier 22, such signal is phase shifted by phase shifter 23 to provide a leading angle and phase shifter 24 to provide a lagging angle. If the capacitive reactance of capacitor 25 is equal to the resistance of resistor 26 and further equal to the resistance of 27 and the capacitive reactance of capacitor 28, the demodulation reference frequencies are 90° out of phase.

The outputs of phase shifters 23 and 24 are connected to amplifiers 8 and 9 and thus provide reference signals for demodulators 6 and 7, which reference signals represent the angular position of rotor 1 and which, further, have carrier frequencies which are 90° out of phase with respect to each other.

It may be appreciated then, by such structure that windings 2 and 3 are excited according to a specific phase and, for example, the resultant magnetic field arising from both windings 2 and 3 may be designed to lead the position of rotor 1 by any desirable angle in order to obtain a desired torque at all speeds. It is generally desirable to have the resultant magnetic field lead the position of the rotor by 90°, in which case the angular force attempting to rotate the rotor is operating on tangentially to the rotor and thus maximum torque is achieved.

Control of the speed or direction of rotor 1 (the structure described thus far causing only self-synchronism of the field) may be provided by a control circuit illustrated at 29, for example, in which an E pickoff core 30 whose central arm 30a has a winding which receives a carrier signal from oscillator 13 together with relatively movable ferromagnetic coupling member 31 which acts to couple the central arm 30a on E pickoff 30 to one or the other of the arms 30b or 30c, in accordance with relative motion between the two members of the pickoff so as to cause a signal of one phase if the relative motion is in one direction and another phase if the relative motion is in the opposite direction. The amplitude of such phase reversible signal indicates the amplitude of the control signal or the amount of motion between the two elements of the pickoff. The control signal output is then an amplitude modulated, phase reversible signal received by amplifier 32 which in turn drives demodulators 6 and 7. Control device 29, of course, may be other types of control systems providing an amplitude modulated carrier signal to demodulators 6 and 7. Rotor 1 will then respond in its direction of rotation to the phase of the signal received and in its speed to the amplitude of the signal received. It will, at the same time, provide its own synchronous field so as to provide maximum torque and maximum response at all speeds and in both directions.

Figure 2:
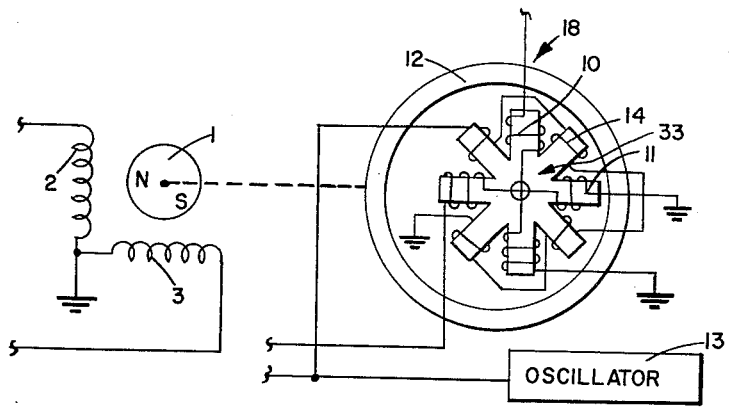
FIG. 2 is a schematic diagram illustrating a typical resolver shown diagrammatically in FIG. 1.

FIG. 2 is illustrative in greater detail of the resolver 18 of FIG. 1. Oscillator 13 is connected to excite winding 14 wound upon an electromagnetic core 33. Winding 10 is also wound on electromagnetic core 33 as is winding 11. Soft iron ring 12 is eccentrically mounted with respect to core 33 and is rotated by the rotor 1 of the multiphase motor. It may be seen then, that as rotor 1 rotates, eccentric soft iron ring 12 couples more or less electromagnetic field from excitation winding 14 into output winding 10 or 11. It may also be seen that the output voltages of windings 10 and 11 will be modulated carriers, which carrier is the frequency provided by oscillator 13. The modulation of windings 10 and 11 will be 90° out of phase with respect to each other. The output windings then provide signals illustrated for example in FIGS. 4 and 5.

Figure 3:
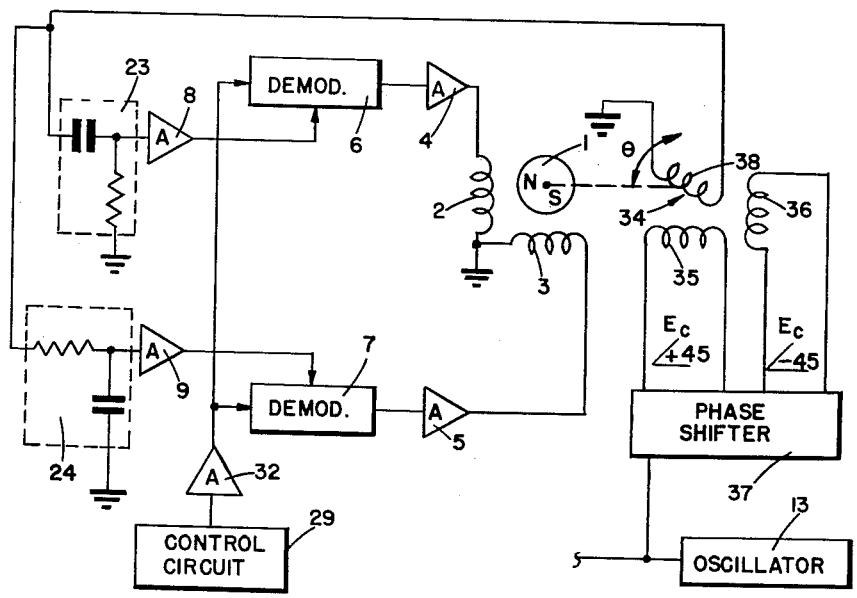
FIG. 3 is another embodiment of the device of the invention illustrating a resolver which directly provides an output signal varying in phase in accordance with the rotor of the motor.

Referring momentarily to FIG. 1, it will be recalled that at summing point 21 there is provided a signal of constant amplitude, but whose phase varies in accordance with the angular position of rotor 1. To obtain this signal, the output of winding 10 was advanced 90° relative to the output of winding 11 and then the signals were combined. The same signal of constant amplitude but varying phase in accordance with angular position of the rotor may be obtained by resolver structure as illustrated in FIG. 3 wherein a resolver 34 has two excitation coils, 35 and 36 which are excited 90° out of phase with respect to each other, provided for example, by the output of a phase shifter 37 connected to receive the output of oscillator 13. As the rotor coil 38 of resolver 34 is rotated by rotor 1, the output will be a phase modulated signal of constant amplitude but with a phase which varies in accordance with the angle of rotation $\theta$ of rotor 1. It can be seen intuitively from looking at the resolver 34 that no change in amplitude of output voltage of winding 38 will occur because as winding 38 becomes parallel to one of windings 35 and 36, it becomes perpendicular to the other and thus the number of magnetic lines of flux cut by coil 38 remain substantially the same. However, inasmuch as windings 35 and 36 are out of phase with respect to each other, the phase angle of the output voltage of winding 38 will vary in accordance with the angle of rotor 1. Phase shifters 23 and 24 are connected to receive the output of winding 38 and provide the relative phase shift of 90° spoken of previously in connection with FIG. 1. Such signals are amplified in amplifiers 8 and 9 and provided to demodulators 6 and 7, respectively, as reference signals. The demodulators 6 and 7 are controlled by signals received from amplifier 32 and control circuit 29 as also described previously with respect to FIG. 1. Rotor 1 will therefore rotate in a direction and at a speed dependent upon the signal provided by control circuit 29. If so designed, it will develop the desired, maximum torque at all times by virtue of its self-synchronous field.

It may be understood then that the concept of the invention is the provision of a phase variable signal which is then divided into two signals in quadrature which are used for demodulating purposes.

Although the invention has been described and illustrated in detail, it is to be clearly understood that the same is by way of illustration and example only and is not to be taken by way of limitation, the spirit and scope of this invention being limited only by the terms of the appended claims.

I claim:

1. Means for generating a signal whose phase varies in accordance with an angular position of an element, phase shifting means connected to receive the output of said means and provide two output signals varying in accordance with said angular position, said output signals being substantially in quadrature relationship with respect to each other, demodulator means connected to receive said quadrature signals as reference signals, and motor means responsive to the output of said demodulator means, said motor means controlling said angular position.

2. In a self-synchronous motor system, said motor having a rotor, a first means providing a carrier frequency signal of constant amplitude but with phase varying in accordance with the angular position of the rotor of said motor, phase shifting means connected to receive the output of said first means and provide two output signals varying in accordance with the angular position of said rotor, said output signals being substantially in quadrature relationship with respect to each other, demodulating means responsive to said two output signals as reference signals, said demodulating means adapted to receive modulated carrier frequency signals and connected to control said motor.

3. In a self-synchronous multi-phase motor system, said motor having a rotor, a first means providing a carrier frequency signal of constant amplitude but with phase varying in accordance with the angular position of the rotor of said motor, a first phase shifting means connected to receive the output of said first means and a second phase shifting means connected to receive the output of said first means, one of said phase shifters providing a 45° leading phase angle and the other of said phase shifters providing a 45° lagging phase angle, a first demodulator connected to receive the output of said first phase shifting means, a second demodulator connected to receive the output of said second phase shifting means, said demodulators utilizing said output signals as reference signals, and one of said demodulators connected to control one phase of said motor and the other of said demodulators connected to control another phase of said motor.

4. In a self-synchronous motor system, said motor being multi-phase and having a rotor, a first means providing a carrier frequency signal of constant amplitude but with phase varying in accordance with the angular portion of the rotor of said motor, isolation means connected to receive the output of said first means, a first phase shifter providing 45° advance in phase connected to receive the output of said isolation means, a second phase shifter providing 45° lag connected to receive the output of said isolation means, a first demodulator connected to receive the output of said first phase shifter, a second demodulator connected to receive the output of said second phase shifter, said demodulator connected to receive said phase shifted signals as reference signals, means providing a control signal and connected to provide input signals to said demodulators, said demodulators connected to control the speed and direction of said multi-phase motor.

5. In a self-synchronous motor system, said motor having a rotor, a first means electrically indicating the angle of the rotor of said motor, a second means electrically indicating the angle of the rotor of said motor, said first and second means providing modulated carrier electrical signals 90° out of phase with respect to each other, a first phase shifting means connected to receive the output of said first and second means and to shift the carrier frequencies of said first and second means so that said carrier frequencies are 90° out of phase with respect to each other, means for summing said phase shifted carrier frequency signals, a second phase shifting means connected to receive the output of said summing means and providing two signals whose carrier frequencies are 90° out of phase with respect to each other, demodulator means connected to receive the output signals of said second phase shifting means as reference signals, said motor connected to be responsive to the output of said demodulator means.

6. In a self-synchronous motor system, first and second means electrically indicating the angle of the rotor of said motor, said first and second means providing modulated carrier electrical signals 90° out of phase with respect to each other, a first phase shifting means connected to receive the output of said first and second means and shift the carrier frequencies of said signals so as to be 90° out of phase with respect to each other, means for summing said phase shifted carrier frequency signals, isolation means, a second phase shifting means connected to receive the output of said summing means providing two signals whose carrier frequencies are 90° out of phase with respect to each other, demodulator means connected to receive the output of said second phase shifting means as reference frequencies, said motor connected to be responsive to the output of said demodulator means.

7. In a self-synchronous motor system, first and second means electrically indicating the angle of the rotor of said motor, said first and second means providing a carrier modulated in accordance with the angular position of said rotor, said modulation provided by said first and second means being 90° out of phase with respect to each other, first phase shifting means connected to receive the output of said first and second means and advance the electrical signal of one of said means 45° and retard the phase of the electrical signal of the other of said means 45° whereby the carrier frequencies of said signals are 90° out of phase with respect to each other, means for summing the output of said first phase shifting means, a second phase shifting means connected to receive the output of said summing means and provide a phase shift advance of 45°, a third phase shifting means connected to receive the output of said summing means and provide a phase shift of 45° lag, whereby two signals whose carrier frequencies are 90° out of phase with respect to each other are provided, a first demodulator means connected to receive the output of said second phase shifter as a reference frequency, a second demodulator means connected to receive the output of said third phase shifter as a reference frequency, said motor connected to be responsive to the output of said demodulators, said demodulators adapted to receive an amplitude modulated carrier frequency control signal.

8. In a self-synchronous motor system, a first resolver means rotated by the rotor of said motor and providing an electrical signal indicating the angle of the rotor of said motor, a second resolver rotated by the rotor of said motor, and providing an electrical signal indicating the angle of the rotor of said motor, said first and second resolvers providing modulated carrier electrical signals whose modulation envelopes are 90° out of phase with respect to each other, a means for displacing the carrier frequencies of said rotors 90° with respect to each other, means summing the electrical output of said immediately previous means, a first phase shifter connected to receive the output of said summing means, a second phase shifter connected to receive the output of said summing means, said first and second phase shifter providing output signals whose carriers are 90° out of phase with respect to each other, a first demodulator connected to receive the output of said first phase shifting means, a second demodulator connected to receive the output of said second phase shifting means, said demodulators receiving the output of said phase shifting means as reference signals, said demodulators connected to control the speed and direction of rotation of said motor, control means connected to provide an amplitude modulated phase-reversible carrier signal to said demodulators to control the speed and direction of said motor.

9. In a self-synchronous motor system, first and second means electrically indicating the angle of the rotor of said motor, said first and second means providing a carrier modulated in accordance with the angular position of said rotor, said modulation provided by said first and second means being 90° out of phase with respect to each other, first phase shifting means connected to receive the output signals of said first and second means and provide a relative phase shift of 90° in the carrier frequencies of said output signals, means for summing the output of said first phase shifting means, a second phase shifting means connected to receive the output of said summing means and provide a phase shift advance of 45°, a third phase shifting means connected to receive the output of said summing means and provide a phase shift of 45° lag, whereby two signals whose carrier frequencies are 90° out of phase with respect to each other are provided, a first demodulator means connected to receive the output of said second phase shifter as a reference frequency, a second demodulator means connected to receive the output of said third phase shifter as a reference frequency, said motor connected to be responsive to the output of said demodulators, said demodulators adapted to receive an amplitude modulated carrier frequency control signal.

10. In a self-synchronous motor system, said motor having a rotor, means providing a carrier frequency signal of constant amplitude but with phase varying in accordance with the angular position of the rotor of said motor, said means comprising induction means having first and second windings excited 90° out of phase with respect to each other, said windings disposed 90° in space phase with respect to each other, a third winding disposed in the common magnetic field provided by said second and third windings, and means for rotating said third winding relative to said first and second winding.

11. The combination recited in claim 10 wherein is included phase shifting means connected to receive the output of said means providing phase varying carrier frequency and providing two output signals varying in accordance with the angular position of said rotor, said output signals being substantially in quadrature relationship with respect to each other, demodulator means responsive to said two output signals as reference signals, said demodulating means adapted to receive modulated carrier frequency signals and connected to control said motor.

12. A self-synchronous motor system comprising a control signal source, a polyphase motor having a rotor, said motor being responsively connected to said control signal source for determining the sense and speed of rotation of said rotor, and synchronous means including means for generating an A.-C. signal of constant amplitude having a time phase corresponding to the angular position of said rotor for synchronizing phase shift of said control signal relative to the rotor angular position in a predetermined amount wherein the motor torque is maximized for all control signal amplitudes.

13. A self-synchronous motor system comprising a motor having a rotor and stator, means for exciting said stator to provide a stator magnetic field, said means including means responsive to said rotor for generating an A.-C. signal of constant amplitude having a time phase corresponding to the angular position of said rotor, and means responsive to said generating means for servoing the angular position of said magnetic field to a predetermined relation with respect to the angular position of said rotor.

14. A self-synchronous motor system comprising a motor having a rotor and stator, means for exciting said stator to provide a stator magnetic field, said means including means responsive to said rotor for generating an A.-C. signal of constant amplitude having a time phase corresponding to the angular position of said rotor and means responsive to said generating means for servoing the angular position of said magnetic field to a predetermined relation with respect to the angular position of said rotor, and control means for varying magnitude and sense of said stator magnetic field whereby the direction and speed of rotation of the motor is varied while motor torque is maximized at all speeds.

15. A self-synchronous motor system comprising a polyphase motor having polyphase field windings and a rotor, means responsive to said motor for generating an A.-C. signal of constant amplitude having time-phase corresponding to the angular position of said rotor, and means responsive to said generator means for providing a polyphase power supply to said polyphase field windings.

16. The system of claim 15, including means for varying said polyphase power supply so as to vary the rotation of said rotor.

References Cited in the file of this patent
UNITED STATES PATENTS

| | | |
|---|---|---|
| 2,041,855 | Ohl | May 26, 1936 |
| 2,462,117 | Mikelson et al. | Feb. 22, 1949 |

OTHER REFERENCES

Hill, W. R.: Electronics in Engineering, first edition, page 247, Fig. 15.9, McGraw-Hill, New York, 1949.